(12) United States Patent
Lang et al.

(10) Patent No.: US 12,187,024 B2
(45) Date of Patent: Jan. 7, 2025

(54) THERMAL PROTECTION CLOSE-OUTS

(71) Applicant: The Boeing Company, Chicago, IL (US)

(72) Inventors: Adam J. Lang, Orange, CA (US); Kevin R. Lenihan, Garden Grove, CA (US); Tracey A. Garcia, Bellflower, CA (US)

(73) Assignee: The Boeing Company, Arlington, VA (US)

( * ) Notice: Subject to any disclaimer, the term of this patent is extended or adjusted under 35 U.S.C. 154(b) by 59 days.

(21) Appl. No.: 17/542,340

(22) Filed: Dec. 3, 2021

(65) Prior Publication Data

US 2022/0266571 A1 Aug. 25, 2022

Related U.S. Application Data

(60) Provisional application No. 63/153,188, filed on Feb. 24, 2021.

(51) Int. Cl.
*B32B 9/04* (2006.01)
*B32B 1/08* (2006.01)
*B32B 5/02* (2006.01)
*B32B 9/00* (2006.01)
*B32B 38/00* (2006.01)
*B32B 38/10* (2006.01)
*B64G 1/58* (2006.01)

(52) U.S. Cl.
CPC ............... *B32B 9/047* (2013.01); *B32B 1/08* (2013.01); *B32B 5/024* (2013.01); *B32B 9/005* (2013.01); *B32B 38/10* (2013.01); *B32B 2038/008* (2013.01); *B32B 2307/304* (2013.01); *B32B 2605/00* (2013.01); *B64G 1/58* (2013.01)

(58) Field of Classification Search
CPC .......... B29B 9/047; B29B 9/005; B32B 1/08; B32B 5/024; B32B 38/10; B32B 2038/008; B32B 2307/304; B32B 2605/00; B32B 7/09; B32B 7/027; B32B 7/12; B32B 5/26; B32B 2250/03; B32B 2250/20; B32B 2262/103; B32B 2262/105; B32B 2307/306; B32B 2571/00; B64G 1/58; B64G 1/401; B64G 1/623; B64G 1/14; B64G 1/402; B64G 1/62; B64G 1/50; B64G 1/226; F02K 9/97; F02K 9/974; F05D 2300/601
USPC ............. 428/36.1, 49, 121, 293.4, 375, 378; 244/158; 501/35; 427/181, 202, 203
See application file for complete search history.

(56) References Cited

U.S. PATENT DOCUMENTS 2,479,483 A * 8/1949 Ekleberry ................ H02G 3/06
                                                         285/341
6,844,057 B2   1/2005  DiChiara, Jr.
6,852,271 B1   2/2005  DiChiara, Jr.
6,969,546 B2  11/2005  DiChiara, Jr.
7,510,754 B2   3/2009  DiChiara, Jr.

(Continued)

*Primary Examiner* — Camie S Thompson
(74) *Attorney, Agent, or Firm* — Hanley, Flight & Zimmerman, LLC (57) ABSTRACT

Thermal protection close-outs are disclosed. A disclosed example thermal protection close-out includes a ring defining an aperture extending therethrough, an outer layer of the ring including a fabric sleeving, and an inner layer of the ring including insulation, the outer layer enclosing the inner layer.

23 Claims, 8 Drawing Sheets

(56) References Cited

U.S. PATENT DOCUMENTS

2017/0001404 A1* 1/2017 Hauk .................... E01D 19/16
2019/0345896 A1* 11/2019 Norman .................. B32B 7/09

* cited by examiner

THERMAL PROTECTION CLOSE-OUTS

RELATED APPLICATION

This patent claims priority to U.S. Provisional Patent Application No. 63/153,188, which was filed on Feb. 24, 2021. U.S. Provisional Patent Application No. 63/153,188 is hereby incorporated herein by reference in its entirety and priority is hereby claimed.

FIELD OF THE DISCLOSURE

This disclosure relates generally to thermal protection applications and, more particularly, to thermal protection close-outs.

BACKGROUND

Some known space vehicles, such as manned spacecraft, employ heat retardant blankets. These blankets are usually glued onto a carrier plate and sometimes include a hole or aperture for tool access (e.g., for removing fasteners). The hole can enable hot gasses to contact and/or reach the carrier plate. In known thermal protection systems, to prevent heat from penetrating or reaching a surface of the exterior of the space vehicle, a bonded plug is placed into the hole during operation of the space vehicle. However, the bonded plug can involve significant expense and be subject to damage, such as thermal damage during re-entry of the space vehicle.

There is, therefore, a desire for an improved thermal protection close-out.

SUMMARY

An example thermal protection close-out includes a ring defining an aperture extending therethrough, an outer layer of the ring including a fabric sleeving, and an inner layer of the ring including insulation, the outer layer enclosing the inner layer.

An example thermal protection soft good includes a fabric having a first aperture, and a close-out positioned in the first aperture. The close-out includes a ring defining a second aperture extending therethrough, an outer layer of the ring including a fabric, and an inner layer of the ring including insulation, the outer layer enclosing the inner layer.

An example method of producing a thermal protection close-out includes placing insulation into a fabric sleeving to define a sleeving assembly, trimming at least a portion of the sleeving assembly at first and second distal ends of the sleeving, and coupling the first and second distal ends together to form a ring of the thermal protection close-out and to enclose the insulation within the sleeving.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Thermal protection close-outs are disclosed. Some heat retardant soft good fabrics (e.g., thermal protection fabrics, soft goods) are employed on known space vehicles. These fabric soft goods are usually mounted to an exterior of a space vehicle and sometimes include a hole or aperture for tool access (e.g., for removing fasteners). In known thermal protection systems, to prevent heat from penetrating or reaching a surface of the exterior of the space vehicle, a bonded plug is placed into the hole during operation of the space vehicle. However, the bonded plug can involve significant expense and be subject to damage, such as thermal damage during re-entry of the space vehicle.

Examples disclosed herein enable a highly effective thermal close-out (e.g., insert) with accurately controlled elastic openings to provide access to areas covered by a thermal protection fabric (e.g., for tool access). Examples disclosed herein can be cost-effective, as well as quickly produced and implemented. Further, examples disclosed herein can be easily implemented onto a thermal protection fabric. Examples disclosed herein enable a close-out fabricated with a ceramic sleeving and insulation materials having a relatively smaller opening than known implementations.

Accordingly, examples disclosed herein can protect small instrumentation ports that extend through a ceramic thermal blanket, for example. Further, when examples disclosed herein are combined with a system that supplies cooling air (e.g., engine bleed air), the hole of the close-out may be sufficiently small to prevent ingress of hot gas/plasma flows.

The aforementioned close-outs may be stitched to a soft good during fabrication, thereby minimizing process and/or manufacturing time. By enabling the close-outs to be attached to the soft good without requiring bonding at an inner mold line (IML), examples disclosed herein enable a relatively small opening to function as an access hole for access to a mechanical attachment and/or mechanism covered by the soft good, for example. As a result, tools can be used to rapidly install or uninstall the soft good, thereby bypassing adhesive cure times and destructive removal techniques. Examples disclosed herein can also enable flexibility for implementing a cavity with an accurately controlled height below and/or underneath the close-out. In some examples, the close-out may be composed of the same or similar materials as the soft good to which it is coupled. Alternatively, the close-out can include different materials that enable specifically designed properties at a penetration site associated with the close-out.

Example thermal protection close-outs include a ring (e.g., an annular ring) defining an aperture extending therethrough. The aperture can be utilized for component and/or tool access while enabling significant thermal protection. According to examples disclosed herein, an outer layer of the ring includes a fabric sleeving (e.g., a woven fabric sleeving), and an inner layer of the ring includes insulation (e.g., an insulation material, a molded or formed insulation component, insulative layering, insulative coating, etc.). The outer layer encloses and/or fully surrounds the inner layer, for example. In some examples, a medial layer of the ring is positioned and/or disposed between the inner and outer layers. In some such examples, the medial layer includes a film (e.g., a ceramic-based film, a plastic film, etc.) that is enclosed by the aforementioned outer layer.

In some examples, the ring is defined by adjoining first and second distal ends (e.g., folded distal ends) of the sleeving. In some such examples, the sleeving is folded into itself. In particular, first and second cut distal ends of the sleeving are folded into the sleeving. In some such examples, the first and second cut distal ends are folded into the sleeving to meet and/or contact one another. In some examples, the ring includes a generally oval-shaped cross-sectional profile. In some examples, the outer layer includes a stitched and/or woven sleeving. In some examples, the close-out is stitched to a thermal protection fabric. In some examples, the insulation and/or the sleeving is at least partially composed of ceramic.

As used herein, the term "close-out" refers to a component, device and/or assembly having an aperture to receive at least a portion of another component. As used herein, the term "insulation" refers to a thermally and/or electrically insulative material, device, component and/or assembly. As used herein, the terms "sleeve" and "sleeving" refer to at least one component that is utilized to at least partially cover, envelop and/or enshroud another component.

Figure 1:
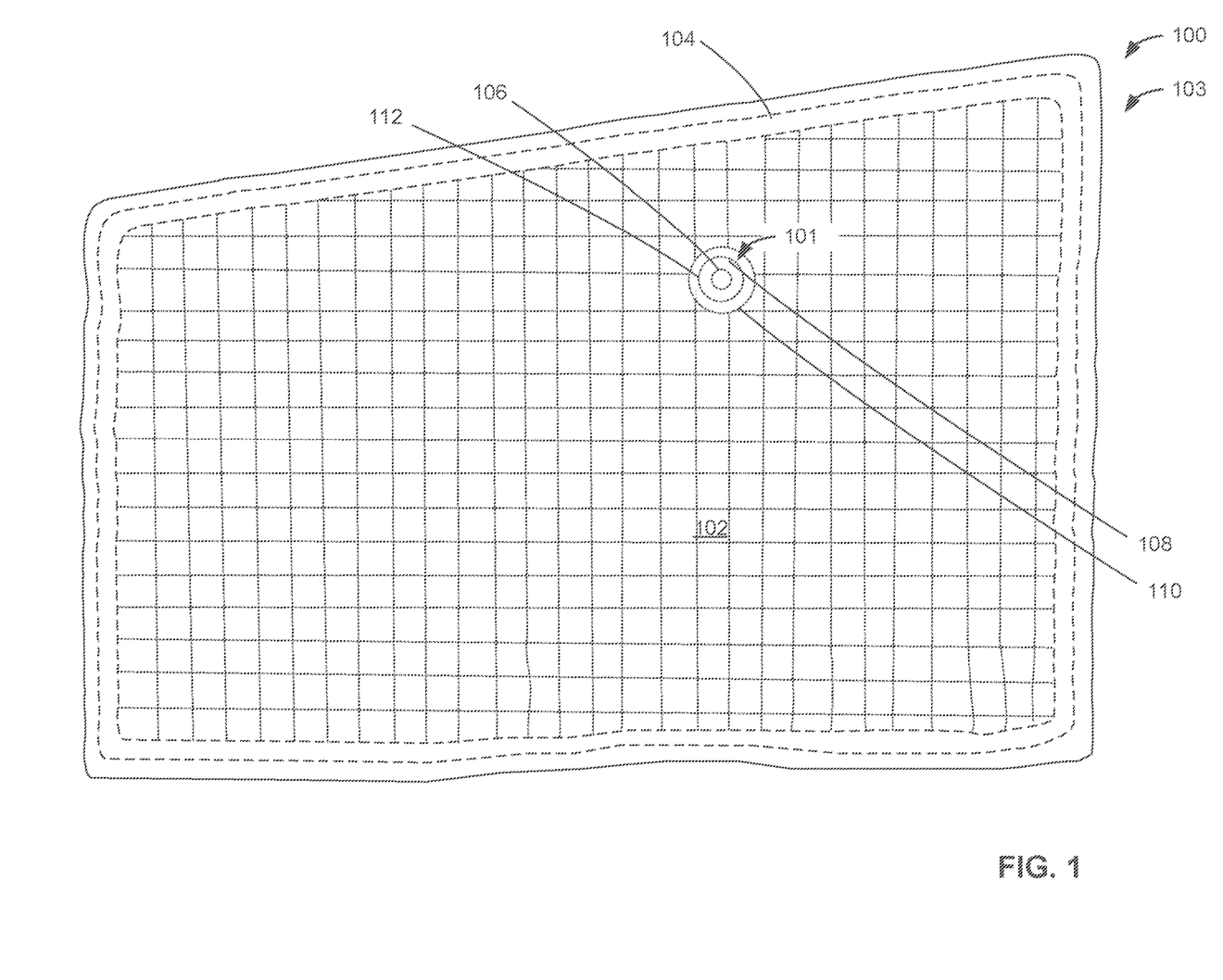
FIG. 1 illustrates an example thermal protection blanket having an example close-out in accordance with teachings of this disclosure.

FIG. 1 illustrates an example thermal protection blanket 100 with an example close-out 101 in accordance with teachings of this disclosure. The blanket 100 of the illustrated example defines a thermal protection soft good 103 and includes a fabric (e.g., an inner fabric perimeter, a fabric body, a stitched fabric portion, a ceramic fabric, etc.) 102, a border (e.g., a border region, a surrounding fabric, an outer fabric region, an edge region, etc.) 104 and the aforementioned close-out 101 which, in turn, includes a ring 108 with an inner hole or aperture (e.g., a central aperture) 106. The example aperture 106 is circular and/or round, and includes a diameter and/or overall dimension of less than 0.5 inches (in) in this example. However, any appropriate dimension can be implemented instead. In the illustrated example, the fabric 102 supports the close-out 101 via a corresponding aperture 110, which is circular in this example to receive the aforementioned ring 108. However, the aperture 106 and/or the aperture 110 can be any appropriate shape including, but not limited to, square, ellipsoid, triangular, rectangular, star-shaped, oblong, etc. In the illustrated example, the close-out 101 is supported and/or positioned by a shoulder (e.g., an annular ring) 112 that is placed and secured into the aperture 110.

In operation, the thermal protection blanket 100 is placed onto and/or coupled to an exterior of a spacecraft so that portions of the spacecraft remain within predetermined heat and/or thermal properties during operation thereof (e.g., during re-entry of the spacecraft). In other words, the example thermal protection blanket 100 protects components and/or portions of the spacecraft from excessive heat. Additionally or alternatively, the thermal blanket 100 is implemented to provide insulation to at least a portion of the spacecraft (e.g., to retain heat).

To provide access to tools and/or at least one component of the spacecraft, the aperture 106 is positioned and/or placed proximate a desired location of the spacecraft to align the aperture 106 for access by components (e.g., tool access, fastener access, maintenance access, etc.). In the illustrated example, the aperture 106 is defined by the aforementioned ring 108, which can be elastic (e.g., compressible, elastically movable, etc.). To facilitate a controlled degree of opening the aperture 106, when no objects (e.g., tools, fasteners, etc.) are placed in the aperture 106, the elasticity of the aperture 106 can enable the aperture 106 to decrease to a relatively small size. As a result, the aperture 106 can reduce an exposure to an object and/or component at least partially covered by the thermal blanket 100 when no objects are inserted into the aperture 106. Conversely, the elasticity of the ring 108 enables the aperture 106 to increase significantly in size when a tool or other object is placed therein. In other words, the example aperture 106 is sized to provide tool access and prevent excess heat from penetrating therethrough. In this example, the aperture 106 is sized to be less than 0.5 inches (in) in a relaxed state. In some examples, the aperture 106 can be expanded to a size that is 1.5 to 10 times larger than the relaxed state (e.g., twice as large as the relaxed state). However, any appropriate hole size, elasticity and/or dimension can be implemented instead. As will be discussed in greater detail below in connection with FIGS. 2A-6, the close-out 101 can have a stitched and/or woven construction that is sewed onto the thermal blanket 100.

Figure 2A:
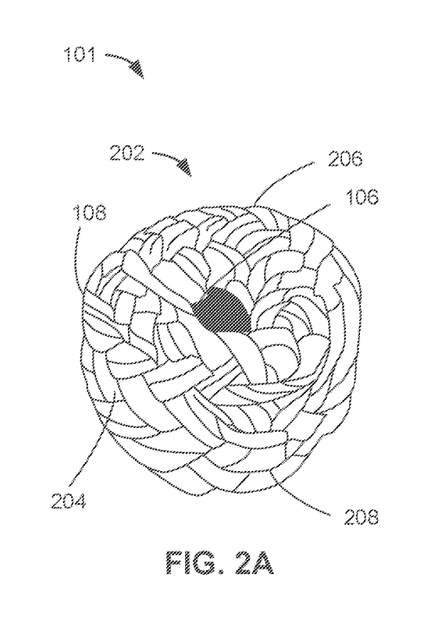
FIGS. 2A-2C are detailed views of the example close-out of FIG. 1.
Figure 2B:
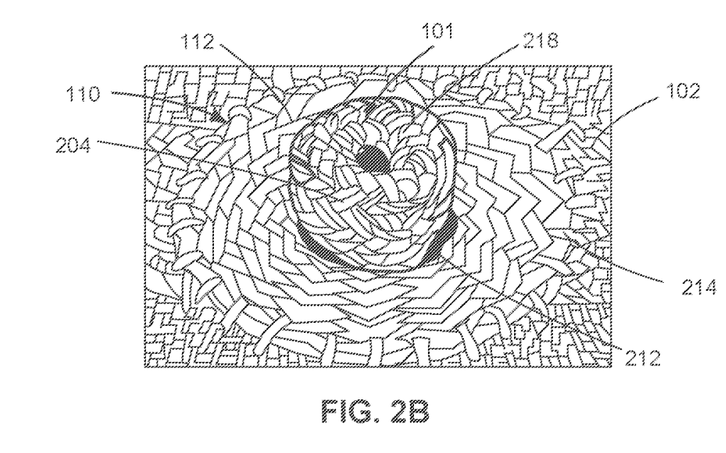
Figure 2C:
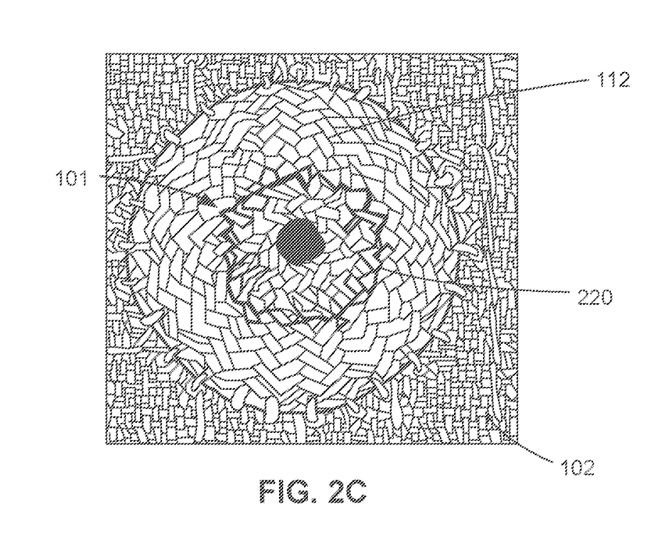

FIGS. 2A-2C are detailed views of the example close-out 101 of FIG. 1. Turning to FIG. 2A, the example close-out 101 is shown unassembled and/or uncoupled from another component for clarity. As can be seen in the illustrated example of FIG. 2A, the close-out 101 includes a body (e.g., an annular body, a cylindrical body, etc.) 202, which defines the ring 108 and the aperture 106 described above in connection with FIG. 1. In this example, the body 202 includes an outer surface (e.g., an outer diametric surface, an outer cylindrical surface, etc.) 204 that extends between longitudinal ends 206, 208, thereby generally resembling a donut or torus shaped object.

FIG. 2B depicts the example close-out 101 being assembled and/or coupled to the fabric 102. In the illustrated example, the outer surface 204 is aligned with and/or brought into contact with the shoulder 112 of the fabric 102. In this example, the shoulder 112 is placed in the aperture 110 and surrounds the outer surface 204 when the close-out 101 is coupled thereto. The example shoulder 112 generally exhibits a cylindrical shape with a central aperture 212 extending therethrough to receive and/or position the close-out 101. In this example, the shoulder 112 is coupled to the fabric 102 via stitching 214.

In some examples, an upper surface 218 of the close-out 101 is flush and/or aligned with an outer surface of the fabric 102, such as an outer mold line (OML) associated with a vehicle (e.g., an aircraft, a spacecraft, a water vehicle, a ground vehicle, etc.), for example, when the close-out 101 is assembled to the fabric 102. In other examples, the upper surface 218 sits below (e.g., under) the outer surface of the fabric 102 and/or the aforementioned OML when the close-out 101 is assembled to the fabric 102.

Turning to FIG. 2C, the example close-out 101 is shown from a top view. In the illustrated view of FIG. 2C, the close-out 101 is shown coupled to the fabric 102. In this example, the close-out 101 is stitched to the shoulder 112 via stitching 220. As a result, the close-out 101 is coupled to the shoulder 112 and, thus, the fabric 102.

Figure 3A:
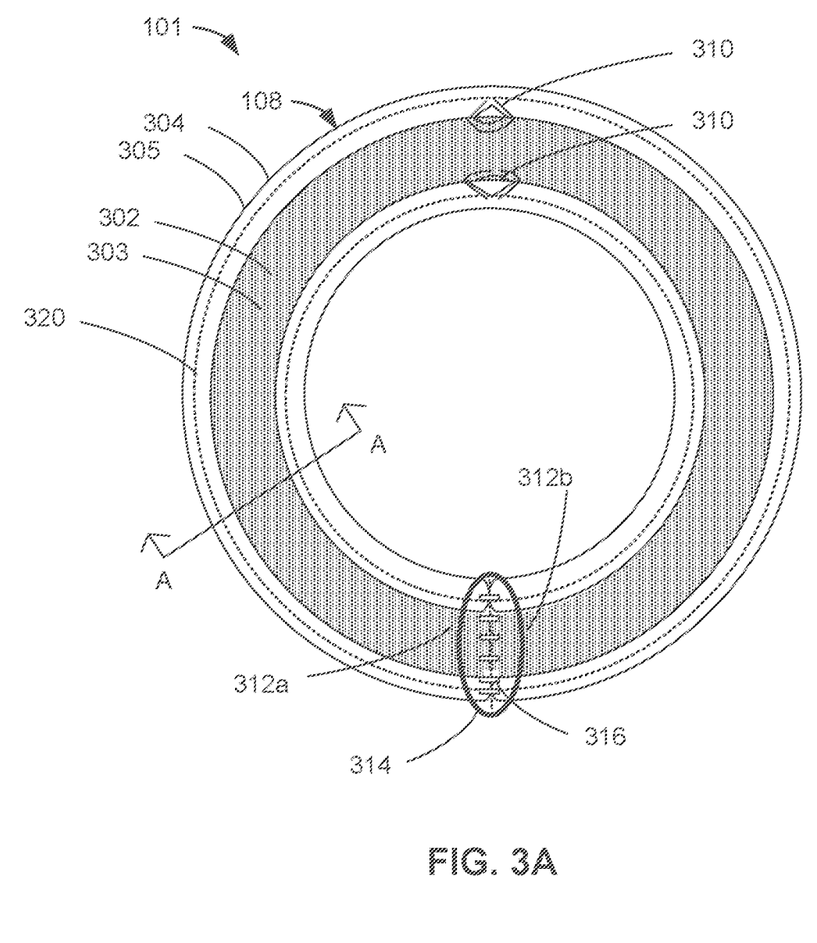
FIGS. 3A and 3B are detailed views of the close-out shown in FIGS. 1-2C.
Figure 3B:
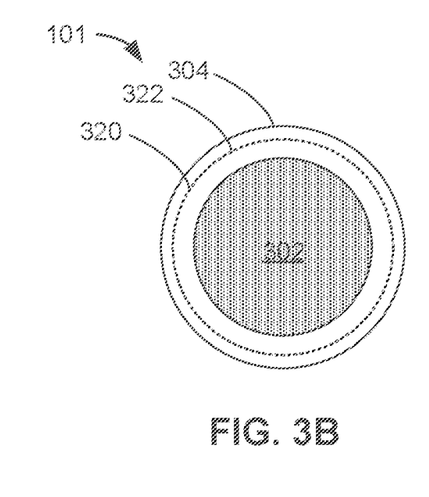

FIGS. 3A and 3B are detailed views of the close-out 101 shown in FIGS. 1-2C. Turning to FIG. 3A, a top partial view of the example close-out 101 of FIGS. 1-2C is shown. In the illustrated view of FIG. 3A, the close-out 101 of the illustrated example includes the ring 108 having an inner layer 302 that is surrounded by an outer layer 304. In this example, the inner layer 302 is at least partially composed of insulation (e.g., a ceramic insulation) 303 while the aforementioned outer layer 304 includes a fabric sleeving 305 (e.g., a woven fabric sleeving), which can be at least partially composed of ceramic.

The close-out 101 of the illustrated example includes an internal fold transition region 310 and distal ends 312 (hereinafter 312a, 312b) that result from folding portions of the close-out 101. The example distal ends 312a, 312b are coupled together at a coupling region 314 with stitching 316 to define the generally ring-like and/or annular overall shape of the close-out 101. In some examples, a medial layer 320 is positioned and/or placed between the inner layer 302 and the outer layer 304. As will be discussed in greater detail below in connection with FIGS. 4-6, the inner layer 302 and the outer layer 304 extend between the distal ends 312a, 312b, which are coupled to one another to define the ring-like shape of the close-out 101. In this example, the inner layer 302 is cut and/or trimmed at the distal ends 312a, 312b to match a longitudinal length of the outer layer 304. In particular, the inner layer 302 can be longer than the cut outer layer 304 prior to cutting the inner layer 302. In some examples, the medial layer 320 is cut with the inner layer 302. In other examples, the inner layer 302, the outer layer 304 and the medial layer 320 are cut together.

Referring to FIG. 3B, a cross-sectional view of the close-out 101 along the line A-A of FIG. 3A is shown. As can be seen in FIG. 3B, the close-out 101 exhibits a generally oval-shaped (e.g., circular shaped) cross-sectional profile. In the illustrated example of FIG. 3B, the outer layer 304 surrounds the inner layer 302 to define a generally circular cross-sectional profile. However, any appropriate cross-sectional profile shape can be implemented instead. The cross-sectional profile shape of the close-out 101 can have a cross-sectional profile that resembles, but is not limited to, a rectangular shape, an oval-like shape, a square shape, a star shape, a triangular shape, etc. In the illustrated example, the outer layer 304 defines an outer circular cross-sectional perimeter surrounding an inner circular cross-sectional perimeter corresponding to the inner layer 302 and/or the medial layer 320.

As can be seen in FIG. 3B, in some examples, the medial layer 320 mentioned above in connection with FIG. 3A is disposed between the inner layer 302 and the outer layer 304. In some such examples, the medial layer 320 includes a film 322. The film 322 can include ceramic fiber insulation and/or a plastic material. In some examples, the film 322 is burned off and/or significantly removed in a heating process subsequent to and/or during assembly of the close-out 101. In some examples, the medial layer 320 is the film 322. In other examples, the medial layer 320 is partially composed of and/or surrounded by the film 322.

Figure 4:
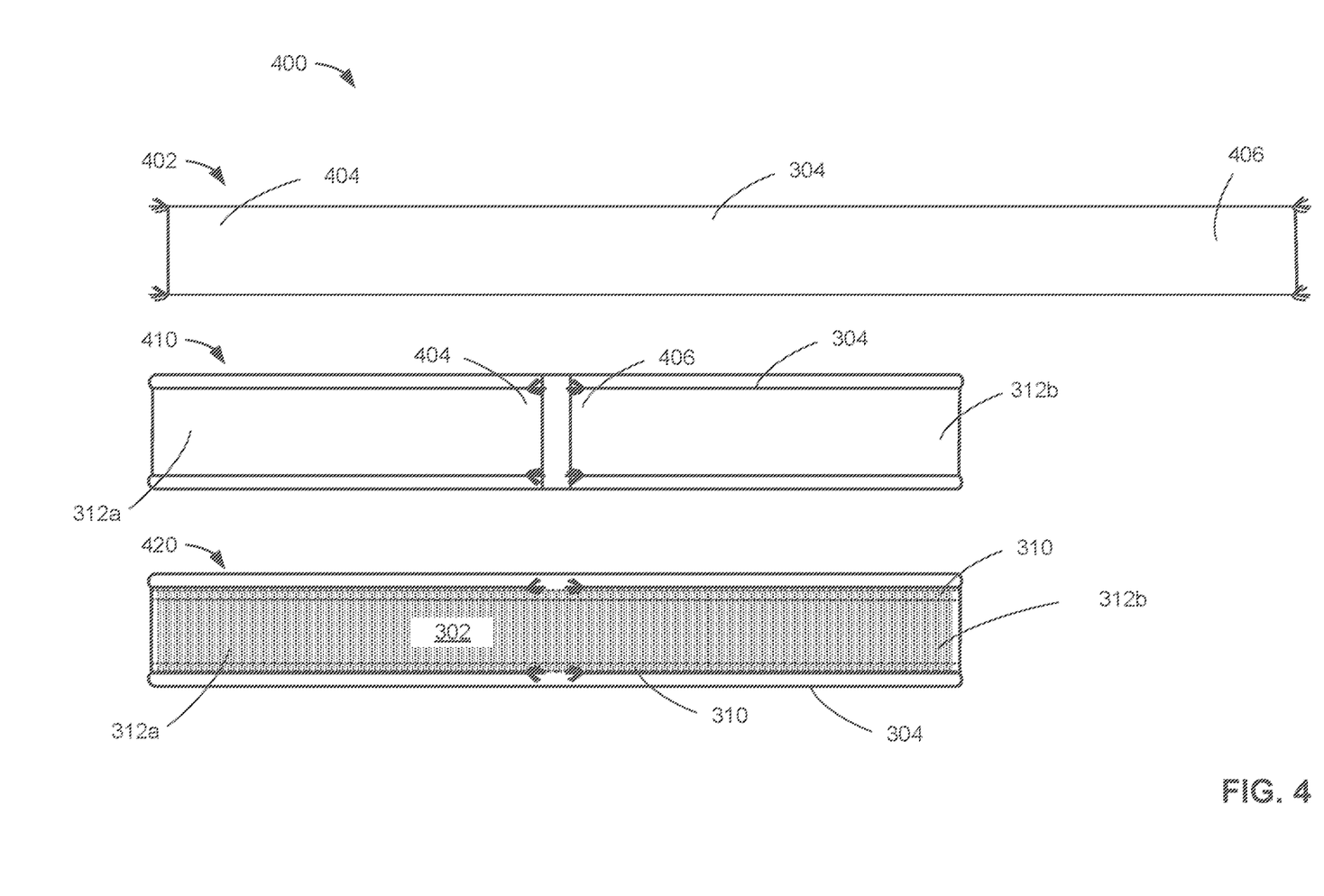
FIG. 4 is an overview of an example process to produce the example close-out of FIGS. 1-3B.

FIG. 4 is an overview of an example process 400 to produce the example close-out 101 of FIGS. 1-3B. In the illustrated example of FIG. 4, the example close-out 101 is shown being produced from a side perspective. As can be seen in step 402, the aforementioned outer layer 304 is cut at cut ends (e.g., cut distal ends) 404, 406 that are spaced apart at a first length of the outer layer 304. In this example, the outer layer 304 is a woven sleeve generally resembling a shape of a jacket of a wire assembly.

At step 410, the outer layer 304 is folded into itself. In this example, the cut ends 404, 406 are folded into an internal volume of the outer layer 304, thereby defining the internal fold transition region 310 shown in FIG. 3A. In other words, the cut ends 404, 406 are folded into the outer layer 304, thereby defining a second length of the outer layer 304 that is less than the aforementioned first length described above in connection with step 402. As a result, the distal ends 312a, 312b are defined. In some examples, a ratio of the second length to the first length is approximately from 0.3 to 0.7 (e.g., 0.5). In some examples, the cut ends 404, 406 are folded inward to meet and/or contact one another within the outer layer 304.

At step 420, the inner layer 302 is placed (e.g., pulled, pushed) within the outer layer 304 such that the inner layer 302 extends past both of the distal ends 312a, 312b. In this example, the inner layer 302, which includes an insulator, is trimmed at the distal ends 312a, 312b to match the second length associated with folding of the outer layer 304. In particular, the inner layer 302 is not cut until the inner layer 302 extends past at least one of the distal ends 312a, 312b of the outer layer 304 (e.g., by at least a distance exceeding a threshold distance). In other examples, the inner layer 302 and the outer layer 304 are cut together. In the illustrated example, the distal ends 312a, 312b are coupled together (e.g., via a sewing operation) to define the ring 108 shown in FIGS. 1-3.

Figure 5A:
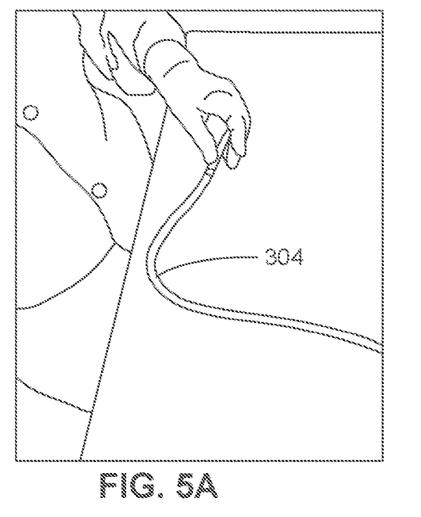
FIGS. 5A-5K illustrate an example process to produce the example close-out of FIGS. 1-4.
Figure 5B:
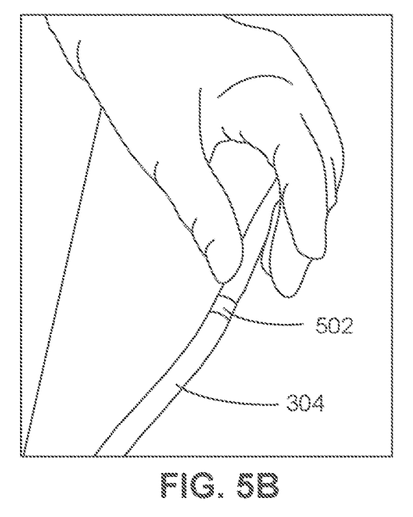

FIGS. 5A-5K illustrate the example process 400 to produce the example close-out 101 of FIGS. 1-4. Turning to FIGS. 5A and 5B, the outer layer 304, which is implemented as a ceramic sleeving in this example, is measured, marked and secured with a piece of tape 502.

Figure 5C:
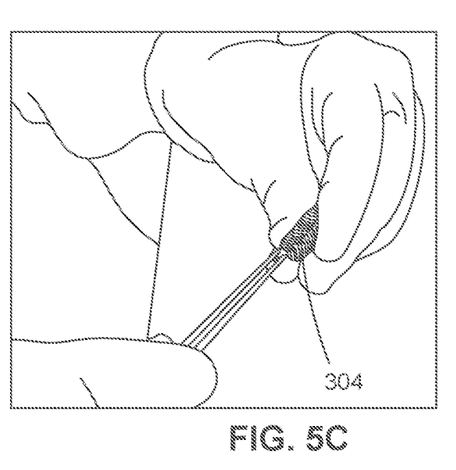
Figure 5D:
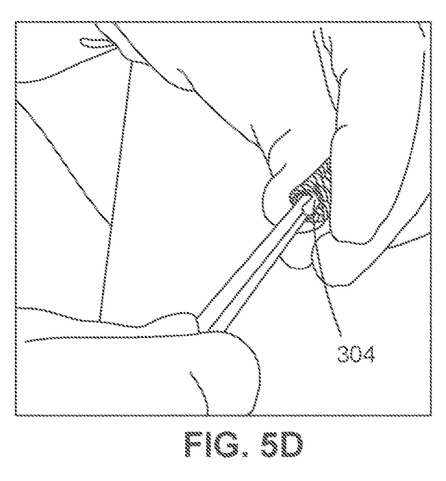

FIGS. 5C and 5D depict the outer layer 304 being folded into itself. In this example, a portion the outer layer 304 is gripped with tweezers and pushed back into the outer layer 304. In this example, a taped end of the outer layer 304 is pushed into the outer layer 304 until the taped end is placed and/or positioned approximately halfway through a longitudinal length of the outer layer 304.

Figure 5E:
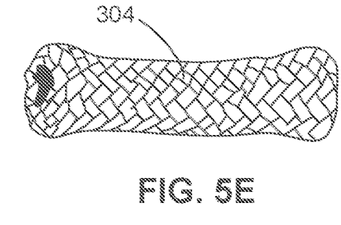

FIG. 5E depicts the outer layer 304 after a side opposite the pushed side is folded into the outer layer 304. In this example, both folded sides (e.g., the cut ends 404, 406) of the outer layer 304 are folded inward to meet and/or contact one another.

Figure 5F:
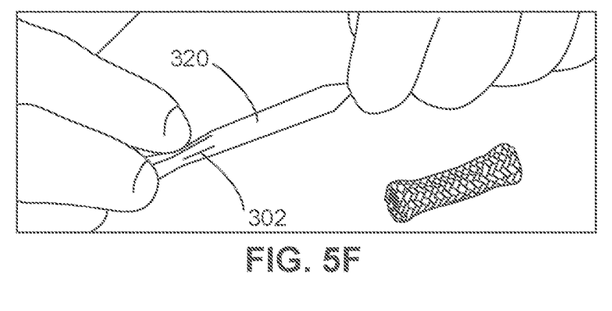

FIG. 5F depicts the inner layer 302 being cut and compressed with the medial layer 320, which is implemented as the film 322 in this example.

Figure 5G:
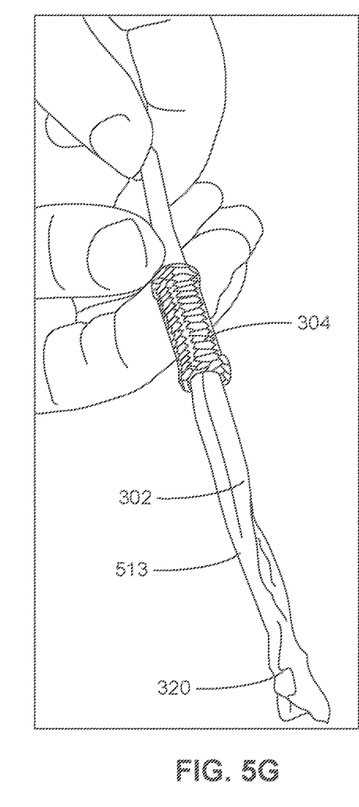

FIG. 5G depicts the inner layer 302 being fed through the outer layer 304, thereby defining a sleeving assembly 513. In this example, the inner layer 302 is surrounded by the medial layer 320. In other examples, however, the inner layer 302 is not surrounded by the medial layer 320.

Figure 5H:
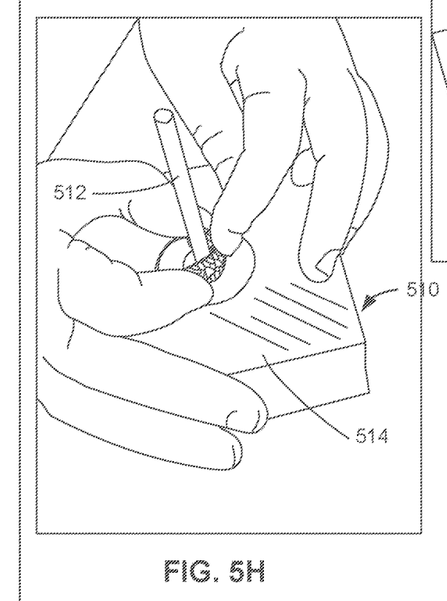

FIG. 5H depicts the aforementioned sleeving assembly being placed on a fixture 510. In this example, the fixture 510 includes a rod 512, which includes a circular cross-sectional profile for defining a diameter of the close-out 101, and a base 514 to support the rod 512.

Figure 5I:
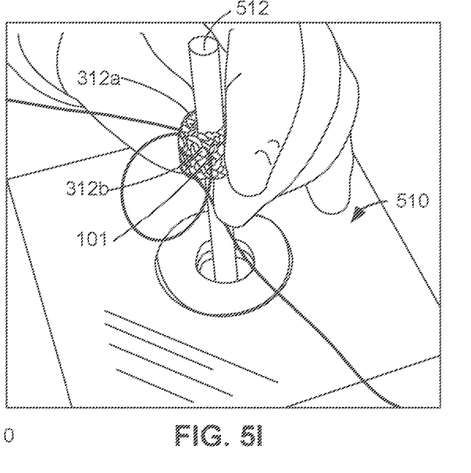

FIG. 5I depicts the distal ends 312a, 312b of the close-out 101 being sewn together while the close-out 101 is supported by the aforementioned rod 512 of the fixture 510. As a result, a ring-shaped structure is defined.

Figure 5J:
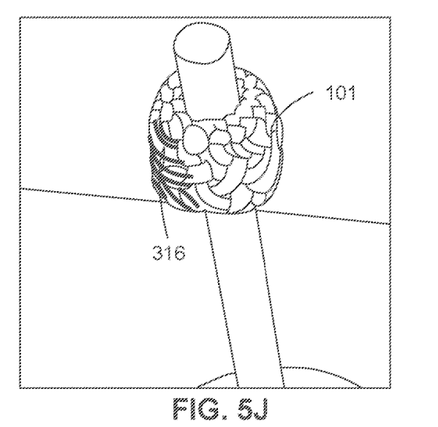

FIG. 5J depicts the completed close-out 101 with the corresponding stitching 316. In this example, the close-out 101 is ready to be integrated to a thermal blanket or other thermal insulation component, for example.

Figure 5K:
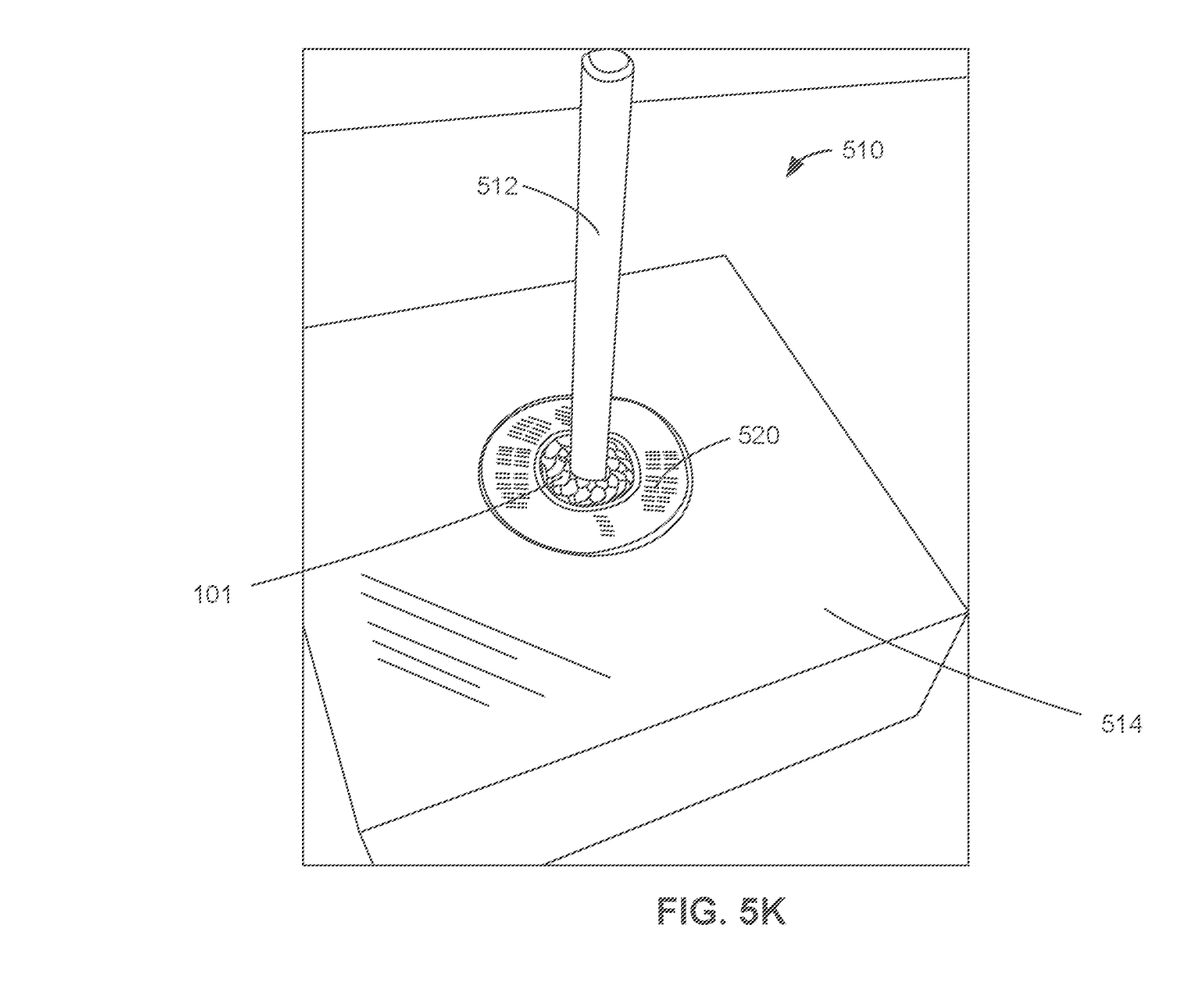

FIG. 5K depicts the close-out 101 being verified in a recess (e.g., an annular groove) of a verification portion 520 of the fixture 510. In this example, the close-out 101 is moved along the rod 512 and into the annular groove to verify that the close-out 101 is produced at the appropriate length and/or size (e.g., diametric size).

Figure 6:
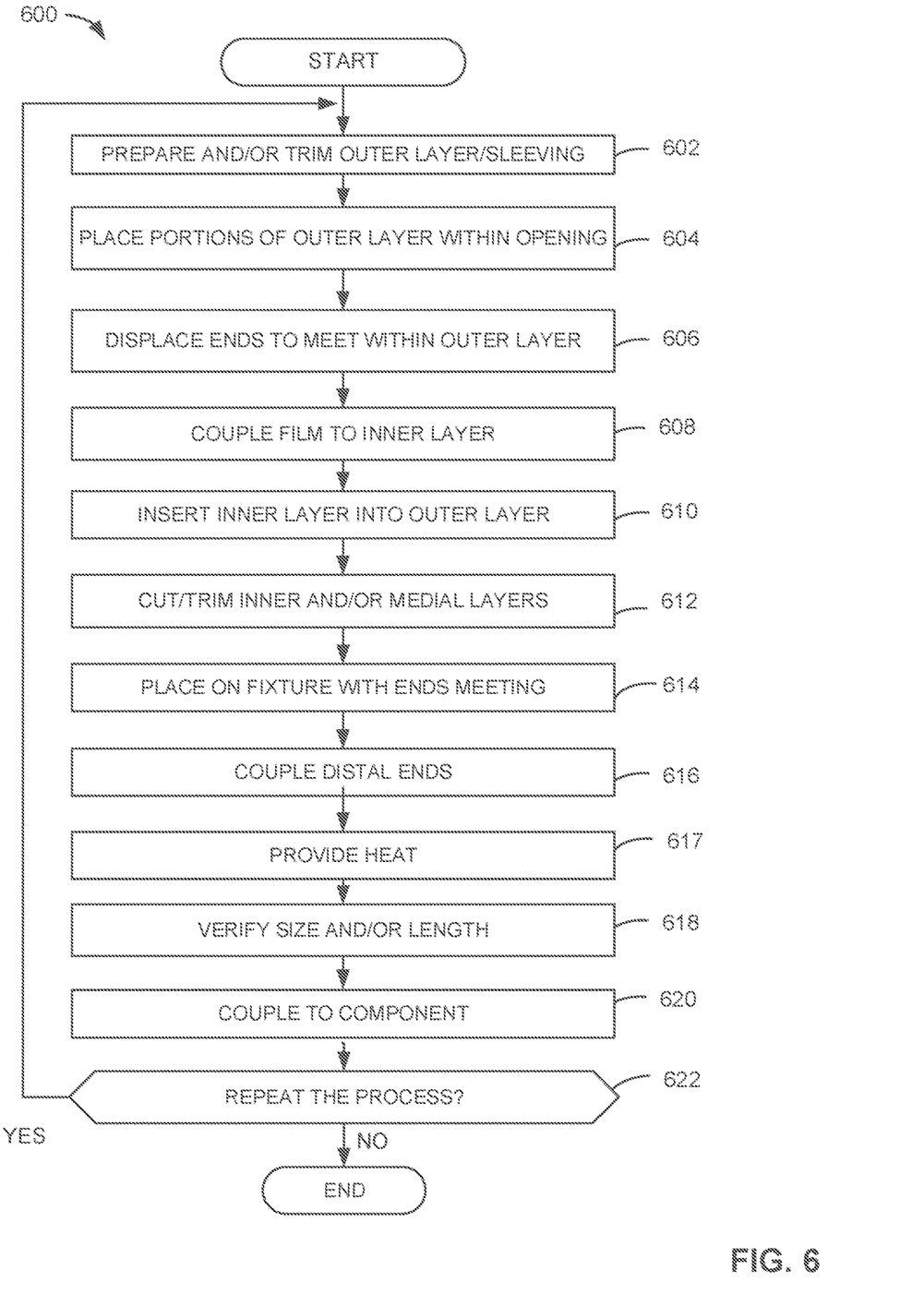
FIG. 6 is a flowchart representative of an example method to produce examples disclosed herein.

FIG. 6 is a flowchart representative of an example method 600 to produce examples disclosed herein. In this example, the close-out 101 is being produced for integration with the blanket 100. In turn, the blanket 100 is to be used with a vehicle (e.g., an aircraft, a spacecraft, a watercraft, a ground vehicle, etc.). In the illustrated example, the close-out 101 is implemented onto the blanket 100 to enable access to an external location of the vehicle.

At block 602, the outer layer 304, which is implemented as with the fabric sleeving 305 in this example, is prepared and/or trimmed. In this example, at least one end of the outer layer 304 is coupled (e.g., taped, adhered, held, etc.) to a stationary structure, such as a table, for example. In some examples, the outer layer 304 is cut and/or trimmed to a desired length, which can correspond to a size of an aperture to allow a component to be inserted therein. Additionally or alternatively, the outer layer 304 is stabilized and/or rigidly held at both of the ends 404, 406. In some examples, the ends 404, 406 of the outer layer 304 are stabilized and/or protected. In some examples, a resistance to deformation of the outer layer 304 is enhanced (e.g., via an additive or other processing).

At block 604, in the illustrated example, at least a portion of the outer layer 304 (e.g., the ends 404, 406) is placed and/or folded within an opening of the outer layer 304. In other words, the outer layer 304 is folded into itself. In this example, the portion corresponds to at least one distal end of the outer layer 304 after the outer layer 304 is cut and/or trimmed.

At block 606, in some examples, first and second portions folded into the outer layer 304 are caused and/or displaced to meet within the outer layer 304. For example, the cut ends 404, 406 of the outer layer 304 are displaced and moved until they meet or contact (e.g., overlap) one another within the outer layer 304. In some examples, the cut ends 404, 406 meet a half a distance (e.g., a halfway point) of the cut outer layer 304.

At block 608, in some examples, the film 322 (e.g., of the medial layer 320) is coupled to the inner layer 302. In this example, the film 322 is to be placed between the inner layer 302 and the outer layer 304 during assembly of the close-out 101. In other words, the film 322 can wrap around the inner layer 302, for example. In some examples, the film 322 is compressed against the inner layer 302. Additionally or alternatively, the film 322 is wrapped around the inner layer 302.

At block 610, the inner layer 302 is inserted and/or pushed into the outer layer 304, thereby defining a sleeving assembly. In this example, the inner layer 302 is pushed through the outer layer 304 until the inner layer 302 extends past both distal ends of the outer layer 304. In other words, in this example, the inner layer 302 has a longer length than the outer layer 304. In some examples, the outer layer 304 is formed to the desired outer diameter, inner diameter and/or height with or without the inner layer 302.

At block 612, in some examples, the inner layer 302 and/or the medial layer 320 are cut and/or trimmed. In this example, the inner layer 302 and/or the medial layer 320 are cut and/or trimmed to match a length of the folded outer layer 304. In some other examples, however, the outer layer 304 is trimmed along with the inner layer 302 and/or the medial layer 320.

At block 614, the aforementioned sleeve assembly is placed onto a fixture to verify a length thereof with the distal ends 312a, 312b meeting and/or contacting one another. In the illustrated example, the distal ends 312a, 312b are placed together to facilitate verification of a longitudinal length of the assembly. In some examples, the outer layer 304, the inner layer 302, the medial layer 320 and/or the close-out 101 is formed to a desired diameter (e.g., inner diameter, outer diameter) and height.

At block 616, the distal ends 312a, 312b of the sleeve assembly are coupled together. In this example the outer layer 304 is composed of a woven fabric and the distal ends 312a, 312b are stitched together, thereby defining the close-out 101. In other words, the outer layer 304 and/or the close-out 101 is closed out against itself.

At block 617, in some examples, heat is provided to the close-out 101. In some examples, the heat is applied via an oven or localized heat source (e.g., a heat gun). For example, the heat can be applied for removal (e.g., dissolving) at least a portion of the medial layer 320 and/or the aforementioned film 322.

At block 618, a size and/or length of the close-out 101 is verified. In this example, the recess of the fixture 510 is implemented for this verification. However, any appropriate fixturing and/or methodology can be implemented instead to verify the length.

At block 620, the close-out 101 is coupled to another component. In this example, the close-out 101 is stitched to the thermal blanket 100, the fabric 102 and/or the shoulder 112.

At block 622, it is determined whether to repeat the process. If the process is to be repeated (block 622), control of the process returns to block 602. Otherwise, the process ends. The determination may be based on whether additional close-outs are to be produced and/or integrated onto additional components (e.g., the blanket 100).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit. Additionally, although individual features may be included in different examples or claims, these may possibly be combined, and the inclusion in different examples or claims does not imply that a combination of features is not feasible and/or advantageous.

Example 1 includes a thermal protection close-out including a ring defining an aperture extending therethrough, an outer layer of the ring including a fabric sleeving, and an inner layer of the ring including insulation, the outer layer enclosing the inner layer.

Example 2 includes the close-out as defined in example 1, further including a medial layer of the ring positioned between the inner and outer layers, the medial layer including a film, the outer layer further enclosing the medial layer.

Example 3 includes the close-out as defined in any of examples 1 or 2, wherein the ring is defined by adjoining first and second distal ends of the fabric sleeving.

Example 4 includes the close-out as defined in example 3, wherein the fabric sleeving is folded into itself proximate the first and second distal ends.

Example 5 includes the close-out as defined in any of examples 3 or 4, wherein the first and second distal ends are stitched together.

Example 6 includes the close-out as defined in any of examples 1 to 5, wherein the ring includes a generally oval-shaped cross-sectional profile.

Example 7 includes the close-out as defined in any of examples 1 to 6, wherein the outer layer includes a woven fabric sleeving.

Example 8 includes the close-out as defined in example 7, wherein the woven fabric sleeving is to be stitched to a thermal protection soft good.

Example 9 includes the close-out as defined in any of examples 1 to 8, wherein the insulation is at least partially composed of ceramic.

Example 10 includes a thermal protection soft good including a fabric having a first aperture, and a close-out positioned in the first aperture. The close-out includes a ring defining a second aperture extending therethrough, an outer layer of the ring including a fabric sleeving, and an inner layer of the ring including insulation, the outer layer enclosing the inner layer.

Example 11 includes the soft good as defined in example 10, further including a medial layer of the ring positioned between the inner and outer layers, the medial layer including a film, the outer layer further enclosing the medial layer.

Example 12 includes the soft good as defined in example 11, wherein the ring is defined by adjoining first and second distal ends of the sleeving.

Example 13 includes the soft good as defined in example 12, wherein the fabric sleeving is folded into itself proximate the first and second distal ends.

Example 14 includes the soft good as defined in any of examples 12 or 13, wherein the first and second distal ends are stitched together.

Example 15 includes the soft good as defined in any of examples 10 to 14, wherein the ring is stitched to the fabric.

Example 16 includes the soft good as defined in examples 10 to 15, wherein the ring includes a generally oval-shaped cross-sectional profile.

Example 17 includes the soft good as defined in example 16, wherein the outer layer defines an outer circular cross-sectional perimeter surrounding an inner circular cross-sectional perimeter including at least one of the inner layer or a medial layer, the medial layer including a film and disposed between the outer and inner layers.

Example 18 includes the soft good as defined in any of examples 10 to 17, wherein the soft good includes a thermal protection blanket.

Example 19 includes a method of producing a thermal protection close-out. The method includes placing insulation into a fabric sleeving to define a sleeving assembly, trimming at least a portion of the sleeving assembly at first and second distal ends of the sleeving, and coupling the first and second distal ends together to form a ring of the thermal protection close-out and to enclose the insulation within the sleeving.

Example 20 includes the method as defined in example 19, wherein the insulation is wrapped in a film.

Example 21 includes the method as defined in any of examples 19 or 20, further including coupling the close-out to a thermal protection fabric.

Example 22 includes the method as defined in example 21, wherein coupling the close-out to the fabric includes stitching the close-out to the fabric.

Example 23 includes the method as defined in any of examples 19 to 22, further including folding the sleeving into itself prior to trimming the at least the portion of the sleeving assembly.

Example 24 includes the method as defined in any of examples 19 to 23, wherein coupling the first and second distal ends together includes stitching the first and second distal ends together.

Example 25 includes the method as defined in any of examples 19 to 24, wherein trimming the at least the portion of the sleeving assembly includes trimming the insulation without trimming the sleeving.

From the foregoing, it will be appreciated that example methods, apparatus and articles of manufacture have been disclosed that enable cost-effective thermal protection closeouts that are relatively easy to manufacture. Examples disclosed herein also enable effective thermal protection, as well as highly accurate dimensional control. Examples disclosed herein can also be highly porous, conformable and flexible.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of thermal protection fabrics and/or soft goods for spacecraft, examples disclosed herein can be applied to any appropriate application including electrical insulation/protection applications.

The following claims are hereby incorporated into this Detailed Description by this reference, with each claim standing on its own as a separate embodiment of the present disclosure.

What is claimed is:

1. A thermal protection close-out comprising:
    a ring defining an aperture extending therethrough, and
    a body of the ring, the body of the ring having a cross-sectional profile that surrounds the aperture, the cross-sectional profile including:
        an outer layer including a woven fabric sleeving, wherein the woven fabric sleeving is stitched to a thermal protection soft good; and
        an inner layer including insulation, the outer layer surrounding and enclosing an entirety of the inner layer along the cross-sectional profile.

2. The close-out as defined in claim 1, further including a medial layer of the ring positioned between the inner and outer layers, the medial layer including a film, the outer layer further enclosing the medial layer.

3. The close-out as defined in claim 1, wherein the ring is defined by adjoining first and second distal ends of the fabric sleeving.

4. The close-out as defined in claim 3, wherein the woven fabric sleeving is folded into itself proximate the first and second distal ends.

5. The close-out as defined in claim 3, wherein the first and second distal ends are stitched together.

6. The close-out as defined in claim 1, wherein the cross-sectional profile is oval-shaped.

7. The close-out as defined in claim 1, wherein the insulation is at least partially composed of ceramic.

8. A thermal protection soft good comprising:
    a fabric having a first aperture; and
    a close-out positioned in the first aperture, the close-out including:
        a ring having a body defining a second aperture extending therethrough, the body of the ring having a cross-sectional profile that surrounds the aperture, the cross-sectional profile including:
            an outer layer including a woven fabric sleeving with the fabric, wherein the fabric sleeving is stitched to the thermal protection soft good, and
            an inner layer including insulation, the outer layer enclosing an entirety of the inner layer along the cross-sectional profile.

9. The soft good as defined in claim 8, further including a medial layer of the ring positioned between the inner and outer layers, the medial layer including a film, the outer layer further enclosing the medial layer.

10. The soft good as defined in claim 9, wherein the ring is defined by adjoining first and second distal ends of the woven fabric sleeving.

11. The soft good as defined in claim 10, wherein the woven fabric sleeving is folded into itself proximate the first and second distal ends.

12. The soft good as defined in claim 10, wherein the first and second distal ends are stitched together.

13. The soft good as defined in claim 8, wherein the ring is stitched to the fabric.

14. The soft good as defined in claim 8, wherein the cross-sectional profile is oval-shaped.

15. The soft good as defined in claim 14, wherein the outer layer defines an outer circular cross-sectional perimeter surrounding an inner circular cross-sectional perimeter including at least one of the inner layer or a medial layer, the medial layer including a film and disposed between the outer and inner layers.

16. The soft good as defined in claim 8, wherein the soft good includes a thermal protection blanket.

17. The soft good as defined in claim 8, wherein a periphery of the woven fabric sleeving of the close-out is stitched to a round aperture of the thermal protection soft good.

18. The soft good as defined in claim 8, further including a shoulder surrounding a periphery of the woven fabric sleeving of the close-out, the shoulder separating the close-out from fabric of the soft good.

19. A method comprising:
    placing insulation into a fabric sleeving to define a sleeving assembly, the fabric sleeving including a woven fabric;
    trimming at least a portion of the sleeving assembly at first and second distal ends of the sleeving;
    coupling the first and second distal ends together to form a ring of a thermal protection close-out and to enclose the insulation within the fabric sleeving, a body of the ring having a cross-sectional profile that surrounds an aperture defined by the ring, the cross-sectional profile including:
        an outer layer including the fabric sleeving, and
        an inner layer including the insulation, the outer layer enclosing an entirety of the inner layer along the cross-sectional profile; and
    stitching the fabric sleeving of the close-out to a thermal protection fabric to couple the close-out to the thermal protection fabric.

20. The method as defined in claim 19, wherein the insulation is wrapped in a film.

21. The method as defined in claim 19, further including folding the fabric sleeving into itself prior to trimming the at least the portion of the sleeving assembly.

22. The method as defined in claim 19, wherein coupling the first and second distal ends together includes stitching the first and second distal ends together.

23. The method as defined in claim 19, wherein trimming the at least the portion of the sleeving assembly includes trimming the insulation without trimming the fabric sleeving.

* * * * *